(No Model.)

C. MEYER, Jr.
MACHINE FOR CLEANING AND WASHING BONES.

No. 313,751. Patented Mar. 10, 1885.

WITNESSES

INVENTOR
Carl Meyer Jr.
By his Attorney

UNITED STATES PATENT OFFICE.

CORD MEYER, JR., OF MASPETH, NEW YORK.

MACHINE FOR CLEANING AND WASHING BONES.

SPECIFICATION forming part of Letters Patent No. 313,751, dated March 10, 1885.

Application filed December 11, 1884. (No model.)

*To all whom it may concern:*

Be it known that I, CORD MEYER, Jr., a citizen of the United States, residing at Maspeth, town of Newtown, Queens county, and State of New York, have invented a new and useful Machine for Cleaning and Washing Bones, of which the following is a specification.

My invention relates to certain new and useful improvements in machinery for washing and cleansing bones preparatory to their further manufacture.

The object of my invention is to provide convenient means for removing all adherent flesh, fat, or other animal tissue from the bones. These materials when removed are collected, and may be utilized in the manufacture of fertilizers, while the bones are thoroughly cleansed and their further manufacture into bone-black and other products is rendered innocuous and inoffensive. The grease is also saved and collected separately.

As my machine does not operate under pressure, very little of the glue or gelatine is removed, leaving the bones in a proper condition to burn for the production of bone-black for sugar-refining and other purposes. I attain these objects by the apparatus illustrated in the accompanying drawings, in which like letters refer to similar parts in both the figures.

Figure 1:
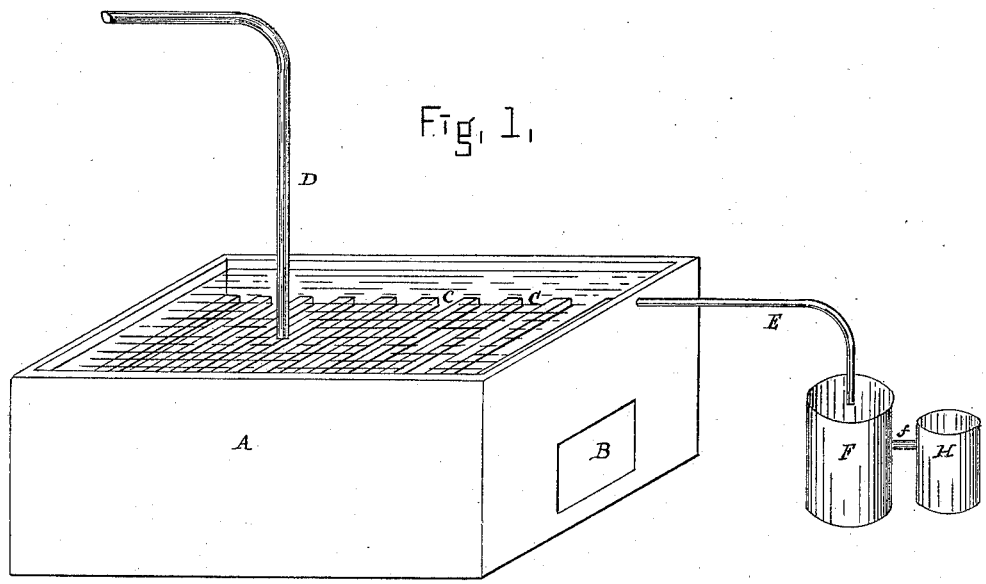
Figure 2:
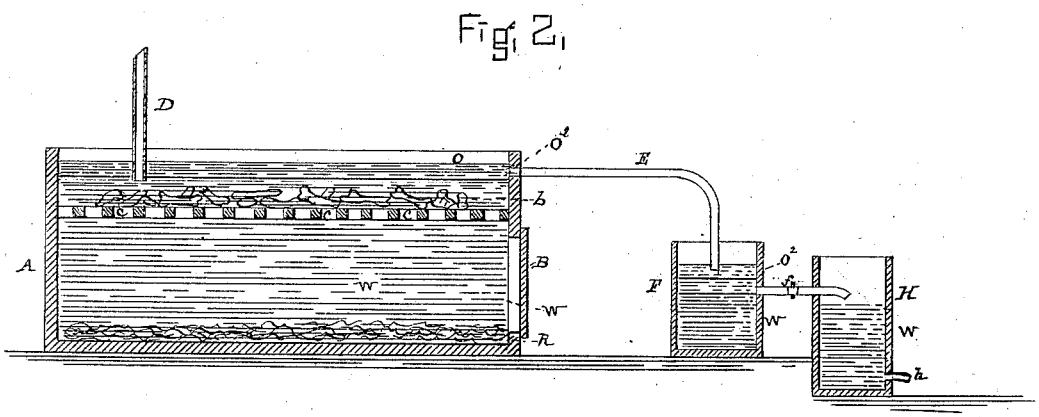

Figure 1 is a perspective view of the entire apparatus. Fig. 2 is a vertical longitudinal section of the entire apparatus.

A is the tank; B, man-hole for the removal of meat and other refuse collecting in the bottom of tank A; C C C, grating upon which bones rest. D is a steam-pipe. E is an overflow-pipe from the tank A to the collecting-vat F, with overflow *f* into receptacle H for surplus liquid, having an outlet-pipe, *h;* O, level of liquid; O², grease floating on water W; R, refuse matter at bottom of tank A, and consisting of meat, grease, and animal tissue removed from the bones by the operation of the machine.

The operation is as follows: The bones are laid on gratings C C C, which are spaced wide enough apart to allow the meat and other matter removed from them to fall to the bottom of the tank, but close enough to retain the bones. The tank is filled up with water to the level O. Steam is admitted by a pipe, D, dipping a short distance below the level surface of the liquid in A, heating the water and agitating the water, so that by the combined action of the hot water and the mechanical agitation the meat separates and, passing through the grating, collects at the bottom of the tank, whence it is removed from time to time as it accumulates by means of the man-hole B. The grease and surplus liquid overflows by the pipe F to grease-collecting vat F, where the grease rising to the top is removed by ladles, while the other liquid, being heavier, can be partially drawn off by the pipe *f* into the receptacle H, whence it can be removed when necessary or desired by the pipe *h*. This liquid in the tank H contains whatever glue may have been removed from the bones.

Having now fully described my invention, what I claim, and desire to secure by Letters Patent, is—

1. In apparatus for cleansing bones, a tank with a grating below the surface, with a grating for supporting the bones to be cleansed, and a chamber below the grating provided with a man-hole, as set forth.

2. In a machine or apparatus for cleansing bones, the combination of a tank provided with a grate and man-hole, substantially as described, with grease and oil collector and separator, substantially as shown and described.

3. In a machine or apparatus for cleansing bones, the combination of a tank with a grate and man-hole, and with a steam-pipe, substantially as shown and described.

4. The combination of the tank A, grating C, and man-hole B with tanks F and H, all substantially as shown and described.

CORD MEYER, JR.

Witnesses:
JOHN M. STEARNS,
RUSSELL A. GREEN.